United States Patent [19]
Davis

[11] Patent Number: 5,771,789
[45] Date of Patent: Jun. 30, 1998

[54] HEATED FOOD DISPLAY CASE WITH MOISTURIZING SPRAY NOZZLE

[75] Inventor: John C. Davis, Bethlehem, Pa.

[73] Assignee: Arneg USA, Inc., Nazareth, Pa.

[21] Appl. No.: 915,100

[22] Filed: Aug. 20, 1997

[51] Int. Cl.[6] ............................. A21B 1/00; A23L 1/00; F27D 1/00; A47J 27/00

[52] U.S. Cl. .............................. 99/468; 99/476; 99/483; 126/21 A; 126/369; 219/401

[58] Field of Search ................... 99/467, 468, 473–476, 99/451, 483, 444–450; 126/369, 21 A, 20, 20.1, 20.2, 348; 219/400, 401; 312/236, 31; 426/418, 523; 110/179, 173 R

[56] References Cited

U.S. PATENT DOCUMENTS

| | | | |
|---|---|---|---|
| 3,926,106 | 12/1975 | Deusing et al. | 126/21 A |
| 3,952,609 | 4/1976 | Klemm | 99/474 |
| 3,962,962 | 6/1976 | Anderson | 99/483 X |
| 3,999,475 | 12/1976 | Roderick | 99/474 |
| 4,010,349 | 3/1977 | Lee | 219/401 |
| 4,011,805 | 3/1977 | Vegh et al. | 99/467 |
| 4,052,589 | 10/1977 | Wyatt | 219/400 |
| 4,062,983 | 12/1977 | Roderick | 426/418 |
| 4,074,108 | 2/1978 | King | 219/214 |
| 4,244,979 | 1/1981 | Roderick | 426/523 X |
| 4,343,985 | 8/1982 | Wilson et al. | 219/214 |
| 4,373,430 | 2/1983 | Allen | 99/468 |
| 5,532,456 | 7/1996 | Smith et al. | 99/474 X |

Primary Examiner—Timothy F. Simone
Attorney, Agent, or Firm—Sanford J. Piltch

[57] ABSTRACT

A food display case for displaying pre-cooked food products while preserving them at optimal serving conditions for prolonged periods of time is disclosed. The display case includes an outer housing with a display window, a recessed primary food heating element which evenly distributes heat across the display case, an air circulation system for providing a convective air flow, and a food moisturizing spray for retaining a desired humidified environment within the display case. In addition, a radiating heat lamp is suspended from the top of the display case for providing additional heating within the display case.

10 Claims, 3 Drawing Sheets

HEATED FOOD DISPLAY CASE WITH MOISTURIZING SPRAY NOZZLE

BACKGROUND OF THE INVENTION

This invention relates generally to food merchandiser cases which are used in both the restaurant and supermarket industries to display prepared foodstuffs. In particular, this invention relates to a display case which both warms and preserves the freshness of prepared foods by utilizing an atomized humidifying fluid stream to maintain a humidity level within the display case to prevent the foodstuffs from drying out in the heated environment.

Traditionally, fast food and gourmet style food restaurants have been on opposite ends of the restaurant industry. This is changing, however, as fast food style restaurants serving gourmet style foods are emerging. Unlike fast food meals, gourmet or "homestyle" meals can not be cooked on demand for immediate service to the customer. Restaurants like Boston Market have been able to provide fast food service for "homestyle" meals through the preparation of large trays of "homestyle" meals in advance and presenting them to the customer in a buffet style setting. The customer can select the desired meal and is served a portion from the tray. A major drawback to this approach, however, is the prolonged period of time over which the food must be displayed. For example, although one tray of food may serve twelve customers, the time at which each customer requests specific food items may be spaced over several hours. During this time, the food must be preserved at the desired serving conditions otherwise the taste, consistency and appearance of the food may become undesirable to the customer. In order to preserve food at desired serving conditions, heated display cases have been utilized.

The heated display cases utilized in most restaurants are dry heat display cases normally found in food markets. U.S. Pat. No. 4,074,108 [King] is illustrative of one current design which utilizes dry heating elements, such as heat lamps. The problem presented by using dry heating element display cases, however, is that they will remove the natural moisture from the food causing it to quickly lose its ready-to-eat fresh appearance.

Other food display cases attempt to maintain the natural moisture of the food by substituting moist heat systems for dry heating elements. For example, U.S. Pat. No. 4,343,985 [Wilson, et al.] discloses a display case which features a water tub surrounded by heating elements. The food trays are placed atop the tub and the water from the tub is heated producing water vapor which both heats and moisturizes the food. Often, the hot tub produces too much condensate, in the form of water vapor, in the case and, as a result, the food within the case becomes mushy, altering its consistency and taste. Further, too much condensate causes the windows of the case to fog and/or attract water droplets, preventing the customer from clearly viewing the food.

Thus, it is desired that a food display case be provided which warms and maintains prepared foodstuffs at desired temperatures while also controlling the moisture content of the air within the case for preserving the foodstuffs for longer periods of time.

Accordingly, it is an object of the present invention to provide a food display case capable of use in a fast food store and the like.

It is a further object of the present invention to provide a food display case which utilizes an atomized stream of humidifying liquid to moisturize the food.

It is a further object of the present invention to provide a food display case which has an air circulation path for preventing fogging of the display window.

It is a further object of the present invention for providing a food display case which maintains food at a desired serving temperature.

Still further, it is an object of the present invention for providing a food display case which maintains sanitary protection of the food.

Other objects, advantages and novel features of the present invention will become apparent from the following detailed description of the invention when considered in conjunction with the accompanying drawings.

SUMMARY OF THE INVENTION

The present invention features a food display case having a display window supported on an outer housing and window frame. An overhead hood, located inside the display window and supported from a bracket connected to the window frame, contains a heat lamp and reflective element for providing supplemental heat to the display case. The outer housing rests upon a supporting frame and contains a humidifying spray system, an air circulation path, and an inner housing.

The inner housing, located within the outer housing, has a front wall, a rear wall, and a base. The base of the inner housing contains heating elements and insulation, heat distribution and retention layers. The heating elements may be electric coils, or similar devices, which transfer heat to the heat distribution and retention layers upon which the food trays are placed. The heating elements are controllable from a panel located on the back of the outer housing.

The air circulation path is located between the inner housing and the outer housing comprising a fan, located behind the rear wall of the inner housing, and an air conduit which connects the fan to a longitudinal duct which runs along the length of the front wall of the inner housing. Warmed air from the display case is inducted into the fan and transferred through the conduit to the longitudinal duct which emits the warmed air onto the display window keeping the window free from fogging due to condensate.

At least one spray nozzle, located in the outer housing above the fan receives a humidifying liquid and pressurized, temperature controlled air from respective feed lines. The humidifying liquid and the air are mixed together at the nozzle to create an atomized stream. The humidifying liquid supplied to the spray nozzle is filtered to remove any impurities capable of contaminating or degrading the foodstuffs. The air supplied from the air feed line to the spray nozzle is siphoned from the air circulation path. Once siphoned from the air circulation path, the air is compressed and channeled into the spray nozzle where it mixes with and warms the humidifying liquid before being sprayed in an atomized stream from the nozzle into the interior of the display case.

BRIEF DESCRIPTION OF THE DRAWINGS

For the purpose of illustrating the invention, there is shown in the drawings an embodiment of the invention which is presently preferred; it being understood, however, that this invention is not limited to precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
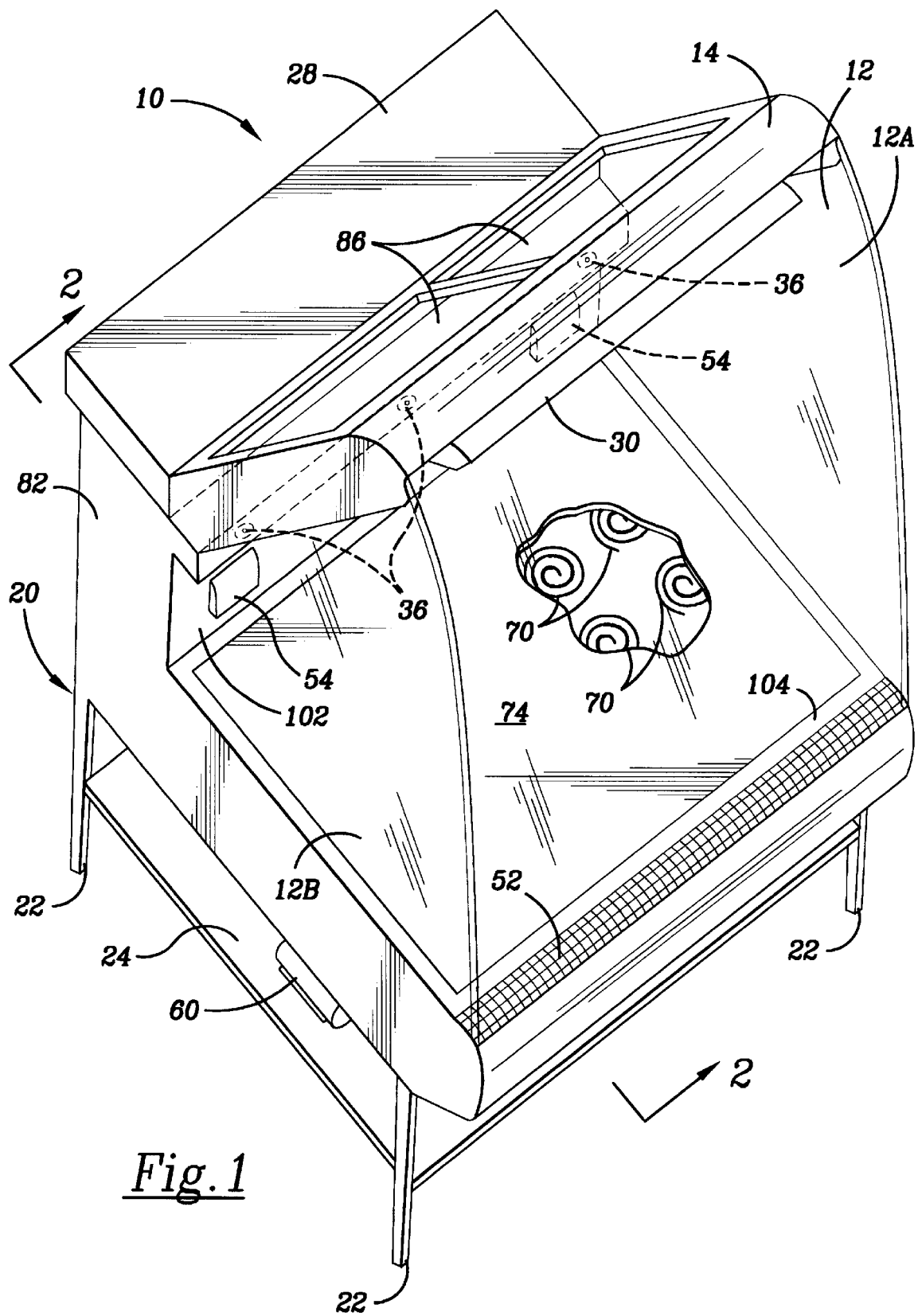
FIG. 1 is an overhead perspective view of the food display case of the invention partially broken away to show the heating elements.

Referring now to the drawings wherein the same reference numbers indicate the same elements, there is shown in FIG. 1, the display case 10 of the present invention. The display case 10 features an outer casement or housing 82 which contains insulating layer 84, primary food heating means 90, atomizing spray nozzle(s) 36 and air circulation fan 42, all of which are shown in FIG. 2, and will be described in greater detail below.

The outer housing 82 supports a front display window 12 and a rear counter top or work surface 28 which is attached to the top rear of outer housing 82. The counter 28 is of sufficient depth to permit food trays to be placed upon it when serving a customer without fear of tipping, yet not overly deep so as to impair cleaning of the display case 10, or in placing food trays within the display case 10. Outer housing 82 rests on a frame 20 with at least four legs 22, located at each corner of the frame 20, and a utility shelf 24 which is attached to the support legs 22 midway along their length. Utility shelf 24 is used to support compressor 60 and humidifying liquid filtration system 88 which supply spray nozzle(s) 36, all of which will be described in greater detail below.

Attached atop and along the front of outer support housing 82 are a forward leaning window support frame 14 and window retention support 18, respectively. Window support frame 14 and window retention support 18 are used to mount display window 12 to the front of outer housing 82. In addition, the window support frame 14 houses sliding window doors 86 which rest in and slide along a track allowing access to the interior of display case 10.

Figure 2:
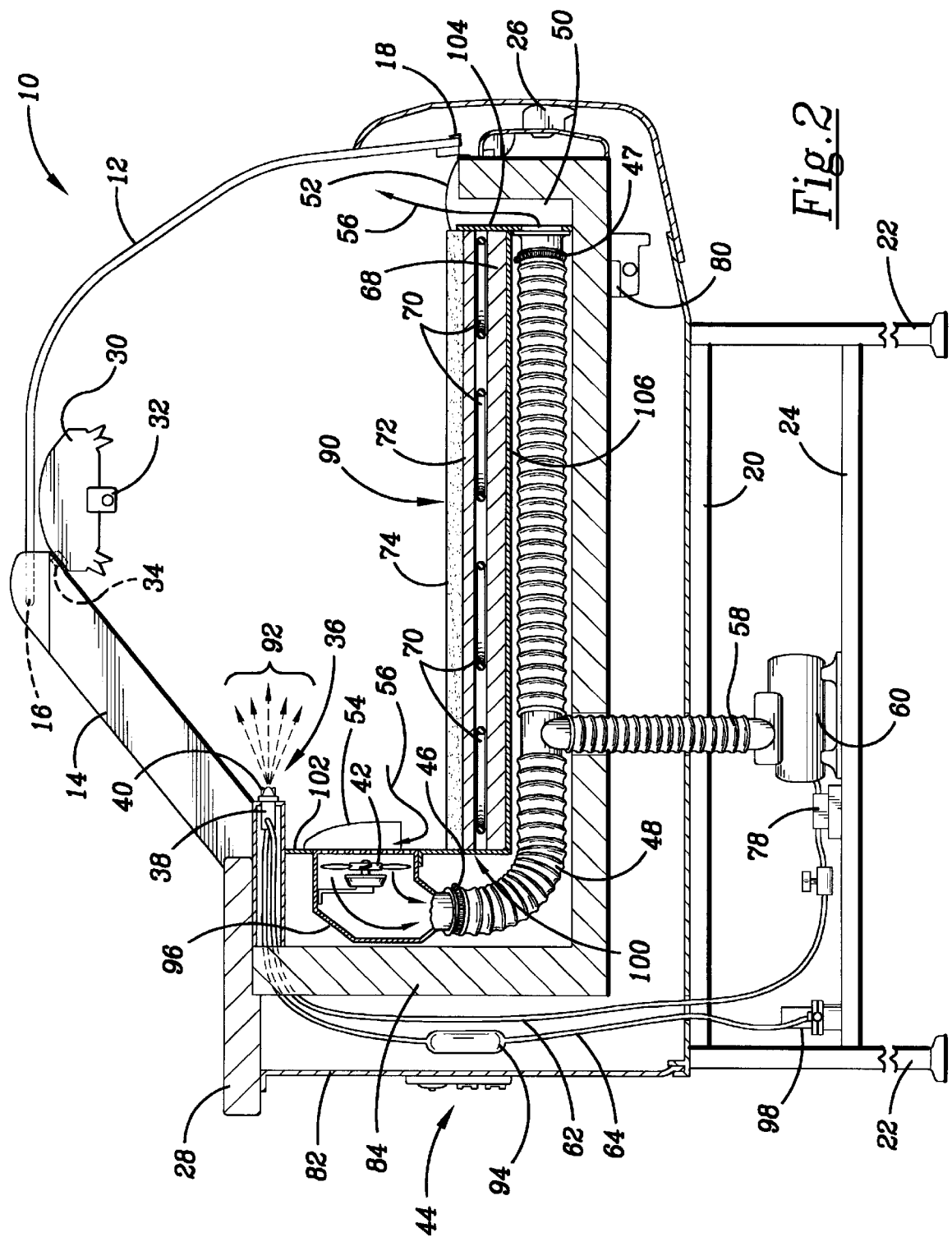
FIG. 2 is a partial sectional view of the food display case of the invention taken along Line 2—2 of FIG. 1.
Figure 3:
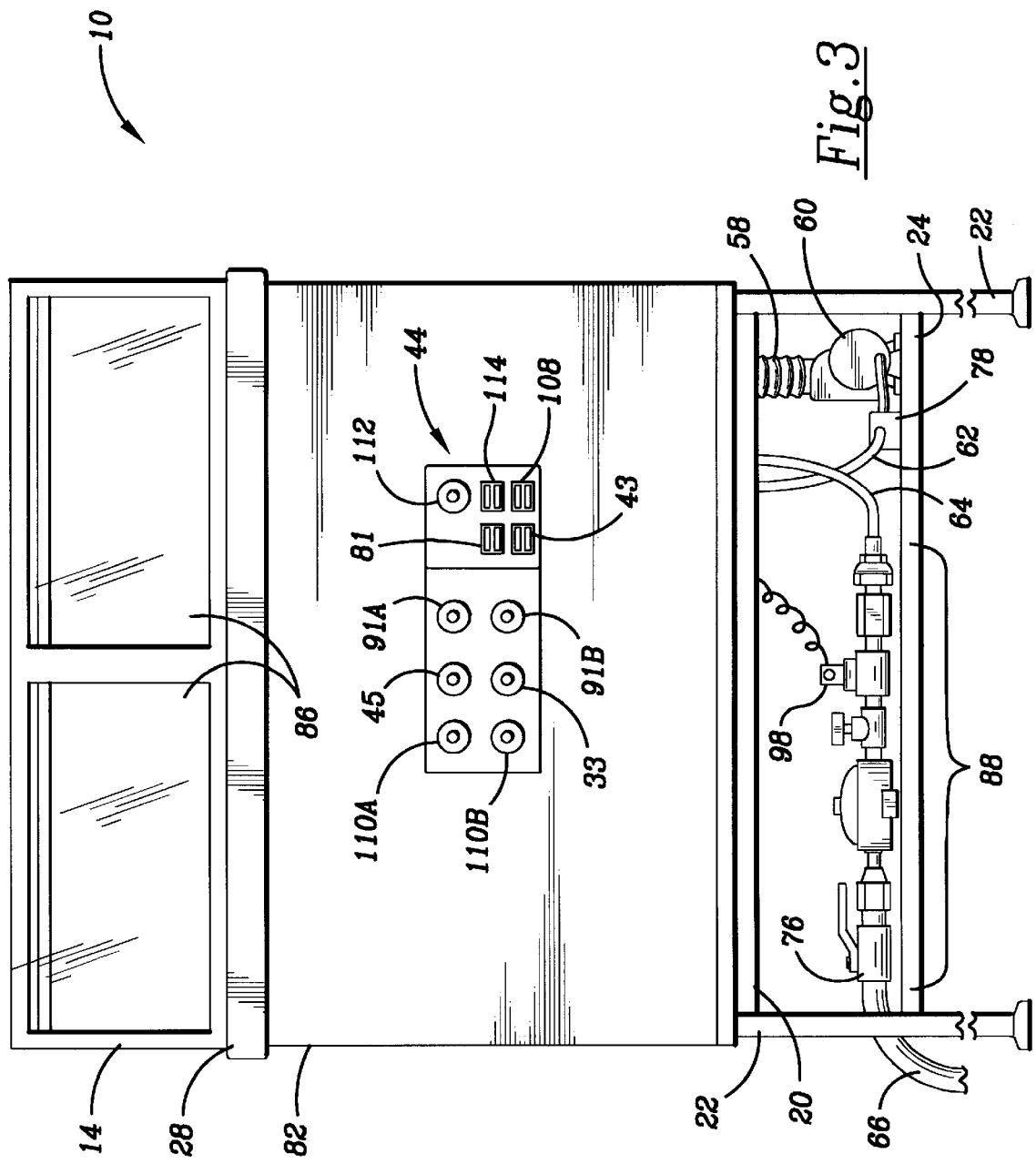
FIG. 3 is a rear view of the food display case of the invention.

As shown in FIGS. 1 and 2, the display window 12 has side panels 12A, 12B which are joined by a sealant along their common, adjacent edges. The display window 12, and side panels 12A, 12B fit within the sides of window support frame 14 and display window 12 is mounted to window support frame 14 by fitting the display window 12 into a retaining groove 16 located at the top of window support frame 14. Display window 12, and side panels 12A, 12B, can be constructed from any transparent material which allows for clear viewing while minimizing the heat transfer through the display window 12. In the present embodiment, display window 12 is constructed from pre-formed insulated glass which is shaped to conjoin with side panels 12A, 12B also made of the same material.

Contained within outer housing 82 is inner housing 100 which comprises a rear wall 102, a front wall 104 and a base 106. Inner housing 100 contains the primary food heating means 90 which rests along the base 106 and warms the food inside display case 10. The primary food heating means 90 comprises a plurality of electric heating coils 70, an insulation layer 68, a heat distribution layer 72, and a heat retention layer 74. Although heating coils 70 are used in the present embodiment, it is important to note that other heat sources can be used such as a hot tub type heat source which features a water tub surrounded by heating elements. The heating coils 70, or other heating element, are located immediately above insulation layer 68. Insulation layer 68 is constructed from a refractive material which minimizes the heat transferred through the base 106 and redirects the heat from the coils 70 upward into the display case 10.

Located immediately above the heating coils 70 is a heat distribution layer 72. The heat distribution layer 72 transfers and disperses heat uniformly over its entire surface area in order to prevent the portions of the heat distribution layer 72 which directly overlie the heating coils 70 from becoming overheated. Thus, food which may be placed directly over one of the plurality of heating coils 70 will not overheat.

In order to transfer heat uniformly over its entire surface area, heat distribution layer 72 is constructed from a material with a low thermal conductivity and a thermal mass which has a low value relative to the thermal conductivity. The heat distribution layer 72 requires an extended period of time in which to achieve the desired heat level, but the extended period will more evenly disperse the heat throughout distribution layer 72. Further, heat distribution layer 72 has a high thermal diffusivity and will transfer heat at an increased rate.

Heat retention layer 74 is positioned in proximal contact with the heat distribution layer 72. The food trays, which are positioned within display case 10, are placed directly on heat retention layer 74. Heat retention layer 74 is constructed from a material which retains heat for prolonged periods of time, has a low coefficient of thermal expansion, and a high resistance to mechanical shock which may result from metal food trays being dropped on the heat retention layer 74. For example, heat retention layer 74 may be constructed from slabs of igneous rock such as granite. Granite is highly resistant to mechanical shock and has the added feature of being aesthetically attractive. Granite, however, has a high coefficient of thermal expansion which may cause micro-cracks to form in the granite when heated and eventually weaken the resistance to mechanical shock. A preferred material for heat retention layer 74 is a glass ceramic, such as an $Li_2O$—$Al_2O_3$—$SiO_2$ system, which has a low thermal expansion coefficient, a high thermal conductivity, and a high resistance to mechanical shock.

Primary food heating means 90 requires advance time to reach optimal operating conditions. During this advance time primary food heating means 90 produces temperatures which are lower than those desired. For example, the heat produced by heating coils 70 must pass through heat distribution layer 72 and heat retention layer 74 for several minutes before the heating means 90 can sufficiently heat the display case 10 to the desired temperature. Therefore, a secondary heating means 32 is provided in the display case 10 to permit faster heating times and to more accurately control the temperature within the display case 10.

In the present embodiment the secondary heating means 32 is a heat lamp. Heat lamp 32 is contained within a refractive overhead hood 30 which is attached to window support frame 14 by bracket 34 so that it is positioned at the top of display window 12. It is important to note that heat lamp 32 is not intended to be in constant use, but is utilized to preheat and to more accurately control any temperature variance within display case 10.

Primary food heating means 90 and secondary heating means 32 provide dry heat which will cause the food stored within display case 10 to lose its natural moisture. In order to prevent the food from becoming dried out, a plurality of spray nozzles 36 provide atomized humidifying fluid streams 92 to the inside of the display case 10. Spray nozzles 36 are spaced equidistantly along the back of display case 10 in such a manner so as to spray atomized humidifying fluid streams 92 into display case 10 directly above the foodstuffs with the geometry of the spray streams overlapping one another. Only a portion of the atomized humidifying streams 92 will land directly on the food, however, because the heated air within the case will cause the evaporation of some of the humidifying fluid in the atomized streams 92 before contact with the foodstuffs. Thus, the atomized humidifying streams 92 provide direct moisture to the food and also create a regulated humidified environment within display case 10.

As shown in FIG. 2, spray nozzle 36 comprises a mixing chamber 38 and a spray head 40. The mixing chamber 38 receives warmed, high pressure air and the humidifying liquid. Once received, the warmed, high pressure air mixes with and forces the humidifying liquid out of spray head 40 creating the atomized humidifying fluid streams 92 with each nozzle having a capacity of injecting approximately ¼ gal/hr of liquid. Each nozzle 36 introduces to the interior of display case 10 an air/water atomized mixture delivering a moisture vapor at approximately 15 micron MVD droplet size. The humidifying liquid, which is preferred to be purified water, is provided to the mixing chamber 38 through feed line 64 at approximately 2 psi. The air is provided to mixing chamber 38 by air feed line 62. Referring to FIGS. 2 and 3, it can be seen that feed line 64 is attached at one end to the mixing chamber 38 and attached at its other end to a filtration system 88 which rests on utility shelf 24. Filtration system 88 is capable of removing impurities or contaminants from the humidifying liquid before it enters the feed line 64 which prevents any contaminants from being sprayed onto the foodstuffs.

Air feed line 62 is attached at one end to the mixing chamber 38 and attached at its other end to pressure regulator 78 and compressor 60. Air compressor 60 receives heated air from display case 10 through an air inlet duct 58 which is joined to air circulation conduit 48 to be described more fully below. Once the air enters compressor 60 its pressure, and likewise its temperature, is increased. Pressure regulator 78 controls the rate of flow of pressurized air to feed line 62 which supplies warmed, pressurized air at approximately 20 psi to mixing chamber 38 of spray nozzle 36. Once feed line 64 enters outer housing 82 and passes through insulation layer 84, it divides into separate feed lines (not shown) to supply each of any number of a plurality of spray nozzles 36.

The humidifying liquid, e.g. water, is supplied to the filtration system 88 by a supply pipe 66. In order to shut off the flow of liquid to the feed line 64, a shut off valve 76 is located at the inlet of filtration system 88. Further, once air feed line 62 enters outer housing 82 and passes through insulation layer 84, it also divides into separate lines (not shown) to supply each of a plurality of spray nozzles 36.

As stated above, the atomized water streams 92 are sprayed directly into display case 10 where a portion of the stream is evaporated. As a consequence of this evaporation, the temperature of display case 10 will drop causing the food stored within to cool. At lower temperatures this is not as significant a consequence because less moisture evaporates from the food, and therefore, less moisture needs to be provided to the display case 10. If it is desired to keep the food at higher temperatures, however, more moisture is required and the food can become cold.

There is believed to exist two solutions to this problem. One solution is to utilize the heat control on control panel 44, located on the rear of display case 10, to overheat the display case 10 beyond the desired temperature with the atomized stream 92 cooling the case to the desired temperature. This will be short lived, however, because the higher the temperature within the display case 10, the more moisture is required to keep the food fresh. The increased moisture level will cause the display case 10 to cool more rapidly and the optimal moisture level and temperature will only exist for a short time. A second solution is to pre-heat the humidifying liquid before it enters the display case 10, which will result in using less heat from the display case 10 to evaporate the water. This is accomplished by using hot, high pressure air to atomize the humidifying liquid and installing an in-line heater 94 positioned around feed line 64. An alternate method of heating the air is to pass the feed line 64 close to the primary heating element 70 and then to the mixing chamber 38 of the spray nozzle 36.

Air circulation fan 42 is responsible for circulating air throughout the display case 10 and supplying compressor 60 with heated air. At least two air circulation fans 42, which operate in tandem, are included in the present embodiment. For purposes of illustration the air circulation fan 42 shown in FIG. 2 will be described. Air circulation fan 42 is located behind the back wall 102 of inner housing 100. As shown in FIG. 2, one of a plurality of spray nozzles 36 is located above fan 42. Although a significant portion of the atomized stream 92 is evaporated, some of atomized stream 92 may enter fan 42 causing damage to its blades. In order to prevent this adverse condition from occurring, a hood 54 is attached to the inside of the back wall 102 of inner housing 100 covering the fan inlet. Thus, moisture from the atomized water stream 92 will deposit on hood 54 instead of being sucked into air circulation fan 42.

Air is inducted into air circulation fan 42 in direction 56 from the interior of display case 10. The air enters fan manifold 96 which directs it into flexible conduit 48. Conduit 48 is attached to fan manifold 96 by hose clamp 46 and is positioned between the base 106 of inner housing 100 and inner insulation 84. The conduit 48 is attached by another hose clamp 47 at its opposite end to longitudinal duct 50. Once air enters conduit hose 48, the air is pushed along by fan 42 and either flows into compressor duct 58, as described above, or flows along conduit 48 into longitudinal duct 50.

Longitudinal duct 50 is positioned along the front wall 104 of inner housing 100 immediately behind and at the bottom of display window 12. Located at the elongated upward facing opening of longitudinal duct 50 is an air baffle 52 which directs air from longitudinal duct 50 onto display window 12 thus defogging and evaporating condensate formed on display window 12. The warm air taken from the interior of the display case 10 and channeled to an opening below the display window 12 defogs and evaporates condensate from the display window 12 allowing the contents of display case 10 to be clearly viewed.

In operation, the display case 10 is placed in operation by setting the main power switch 43 to "ON", which switch is located on the control panel 44. This will immediately begin the operation of air circulation fan 42 and activate the lights within the display case 10, such as foot light 80. Subsidiary power switches may be used for controlling power to the fan 42 and the display lights 80 utilizing switches 45 and 81, respectively. Fan switch 45 is an infinite controllable switch and light switch 81 is an illuminated rocker switch. The desired temperature is then selected by operating the thermostatic control 91 for the primary food heating means 90, an infinite control thermostat, split into right and left side controls 91A, 91B, also located on control panel 44. In order to rapidly heat the display case 10, or to supplement the heat within the display case 10, the secondary heating means 32 can also be activated by operating its thermostatic control 33, a quartz heat/light dimmer with push on/off infinite control light switch, also located on control panel 44.

Once the desired temperature is obtained in the interior of the display case 10, a tray of food may be placed within the display case 10 by opening the sliding door 86 to gain access to the interior. The humidifying spray can then be activated by operating the humidifying control switches 108, 112 which are power on/off switch and multi-station humidification control switch, respectively. The control switch 112 can be either a pin-type settable variable on/off timer or a multi-station variable "on" time/"off" time controller with indicator lamps 114. also located on control panel 44. This multi-station timer operates the heated air and humidifying liquid sources to the spray nozzle 36 to be activated at specified intervals. For example, the controller 112 will start the compressor 60 and will open solenoid valve 98 commencing the flow to air feed line 62 and feed line 64, respectively. The controller 112 is set according to the temperature level within the case and the type of food stored within. For example, a certain foodstuff may require more moisture so the controller 112 will be set to control the activation of the spray nozzles 36 more frequently.

Several of the control switch functions may be split between or among like control switches such that "spare" control switches 110A, 110B may assume the function of an additional control of the primary heating source 90 so that left, center and right sections are independently controlled. Alternatively, the secondary heating source 32 may be controlled in sections, right and left, so that another control switch, like switch 33, can be placed on control panel 44. Likewise, the fans 42 can be separately controlled so that the speed of each fan is controlled by another switchlike switch 33. The control panel 44 may also be arranged to include power indicator lights when certain controls are in operation, such as indicator lamps 114.

Once the display case 10 of the present invention is in operation, the customer is able to clearly view the food stored within the display case 10. The customer makes a selection and the restaurant worker opens sliding door 86. The desired tray of food is then removed and sliding door 86 closed in order to preserve the heat and humidity level within the case. The tray is placed on counter top 28 where a portion of food from the tray is placed on the customer's plate. The worker then re-opens sliding door 86 and places the food tray within display case 10.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A display case which heats and preserves diverse foodstuffs while allowing these foodstuffs to be clearly viewed comprising:

a display window constructed from a thermally insulating transparent material;

an outer housing having said display window mounted thereto;

an inner housing disposed within said outer housing, said inner housing having a rear wall, a front wall and a base;

a primary food heating means disposed across the base of said inner housing;

at least one air circulation means for recirculating warmed air to maintain a defogged condition on said display window located between said inner and said outer housings; and at least one spray nozzle for providing an atomized humidifying fluid stream to retain a pre-determined level of humidity within said display case; and control means for maintaining a heat/humidity balance within said display case so that foodstuffs contained therein are at ready to eat temperatures and consistency.

2. The display case according to claim 1, wherein said food heating means comprises:

a refractive insulation layer disposed across the base of said inner housing;

a plurality of heating coils located above said refractive thermal insulation layer;

a heat distribution layer disposed atop and immediately adjacent said plurality of heating coils; and a heat retention layer constructed from a material having low thermal diffusivity disposed atop and in contact with said heat distribution layer.

3. The display case according to claim 2, wherein said heat retention layer is constructed from granite.

4. The display case according to claim 2, wherein said heat retention layer is constructed from borosilicate glass ceramic.

5. The display case according to claim 1, wherein said food heating means comprises:

a refractive insulation layer disposed across the base of said inner support housing; and at least one water carrying receptacle disposed over a plurality of heating coils located above said refractive insulation layer.

6. The display case according to claim 1, further comprising a longitudinal duct for distributing recirculated air for defogging said display window, said longitudinal duct being positioned along the interior of the front wall of said outer housing below said display window and receiving said air from said air circulation means through a conduit.

7. The display case according to claim 1, wherein said at least one nozzle for providing an atomized humidifying fluid stream comprises a spray head connected to a mixing chamber which mixes high pressure air supplied from said air recirculation means through an air feed line and humidifying liquid supplied from a separate feed line creating said atomized stream.

8. The display case according to claim 7, wherein said feed line which supplies humidifying liquid to said mixing chamber is connected at one end to said mixing chamber and connected at its other end to a filtration means which removes contaminants from the humidifying liquid reducing risk of infectious contamination of the food disposed within said display case.

9. The display case according to claim 8, further comprising an in-line heater for pre-heating the humidifying liquid before being mixed with high pressure air and sprayed into said display case to decreasing interior air cooling resulting from introduction of said atomized stream into said display case.

10. The display case according to claim 7, wherein said air feed line which supplies high pressure air to said mixing chamber is connected at one end to said mixing chamber and is connected at its other end to an air compressor which receives low pressure air from said at least one air circulation means.

* * * * *